US012344012B2

(12) United States Patent
Inada

(10) Patent No.: US 12,344,012 B2
(45) Date of Patent: Jul. 1, 2025

(54) PRINTING APPARATUS AND CONTROL METHOD

(71) Applicant: CANON KABUSHIKI KAISHA, Tokyo (JP)

(72) Inventor: Masakazu Inada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 17/846,982

(22) Filed: Jun. 22, 2022

(65) Prior Publication Data

US 2022/0410604 A1 Dec. 29, 2022

(30) Foreign Application Priority Data

Jun. 24, 2021 (JP) ................................. 2021-104933

(51) Int. Cl.
*B41J 29/38* (2006.01)
*B41J 2/175* (2006.01)

(52) U.S. Cl.
CPC ........... *B41J 29/38* (2013.01); *B41J 2/17596* (2013.01)

(58) Field of Classification Search
CPC ...... B41J 29/38; B41J 29/393; B41J 2/17596; B41J 2/175; B41J 29/13; B41J 2/17509; B41J 2/045; B41J 2/04501
See application file for complete search history.

(56) References Cited

U.S. PATENT DOCUMENTS

2003/0001920 A1* 1/2003 Harada ................ B41J 2/16532 347/30
2007/0097187 A1 5/2007 Lewey
2013/0300786 A1* 11/2013 Muyskens ................ B41J 2/175 347/7
2020/0316951 A1 10/2020 Narazaki

FOREIGN PATENT DOCUMENTS

| | | | |
|---|---|---|---|
| CN | 102615980 | A | 8/2012 |
| CN | 105873766 | A | 8/2016 |
| CN | 107199785 | A | 9/2017 |
| CN | 107379762 | A | 11/2017 |
| CN | 108688319 | A | 10/2018 |
| CN | 111002717 | A | 4/2020 |
| CN | 111746126 | A | 10/2020 |
| JP | S62220343 | A | 9/1987 |
| JP | 2001001536 | A | 1/2001 |
| JP | 2005040967 | A | 2/2005 |
| JP | 2014-188929 | A | 10/2014 |
| JP | 2015066842 | A | 4/2015 |
| JP | 2016221846 | A | 12/2016 |
| JP | 2020131571 | A | 8/2020 |
| WO | 2015046197 | A1 | 4/2015 |

* cited by examiner

*Primary Examiner* — Justin Seo
(74) *Attorney, Agent, or Firm* — Canon U.S.A., Inc. I.P. Division

(57) ABSTRACT

A printing apparatus includes a tank configured to contain liquid to be supplied to a print head performing a printing operation by ejecting the liquid, a flow channel configured to supply the liquid from the tank to the print head, a power supply unit configured to receive electric power and supply the electric power to the printing apparatus, and a closing (Continued)

mechanism configured to close the flow channel in response to stoppage of electric power supply to the power supply unit.

12 Claims, 8 Drawing Sheets

PRINTING APPARATUS AND CONTROL METHOD

BACKGROUND

Field

The present disclosure relates to a printing apparatus for printing an image and a method for controlling the printing apparatus.

Description of the Related Art

Some inkjet printing apparatuses have a configuration in which ink is supplied from an ink tank containing the ink to a print head through an ink supply path. If the posture of the printing apparatus changes when the printing apparatus is transported, positive pressure may be applied to the ejection port of the print head, and ink leakage may occur.

Japanese Patent Laid-Open No. 2014-188929 describes a printing apparatus including a choke valve capable of manually closing a flexible tube that serves as an ink supply path. In addition, when a configuration of a printing apparatus is employed in which the printing apparatus enters a power-off enabled state in conjunction with the operation of closing the choke valve, it prevents forgetting to close the valve and, thus, ink leakage from the print head can be prevented.

However, according to the configuration described in Japanese Patent Laid-Open No. 2014-188929, if power supply to the printing apparatus is lost before the operation of closing the choke valve is performed, the choke valve may not be in a closed state at the right time.

SUMMARY

The present disclosure provides a printing apparatus capable of preventing liquid leakage. According to an aspect of the present disclosure, a printing apparatus includes a print head configured to perform a printing operation, a tank configured to contain liquid to be supplied to the print head, wherein the print head performs the printing operation by ejecting the liquid, a flow channel configured to supply the liquid from the tank to the print head, a power supply unit configured to receive electric power and supply the electric power to the printing apparatus, and a closing mechanism configured to close the flow channel in response to stoppage of electric power supply to the power supply unit.

Further features of the present disclosure will become apparent from the following description of exemplary embodiments with reference to the attached drawings.

BRIEF DESCRIPTION OF THE DRAWINGS

FIG. 6 is a flowchart when the printing apparatus according to the first embodiment is powered on.

DESCRIPTION OF THE EMBODIMENTS

Figure 1:
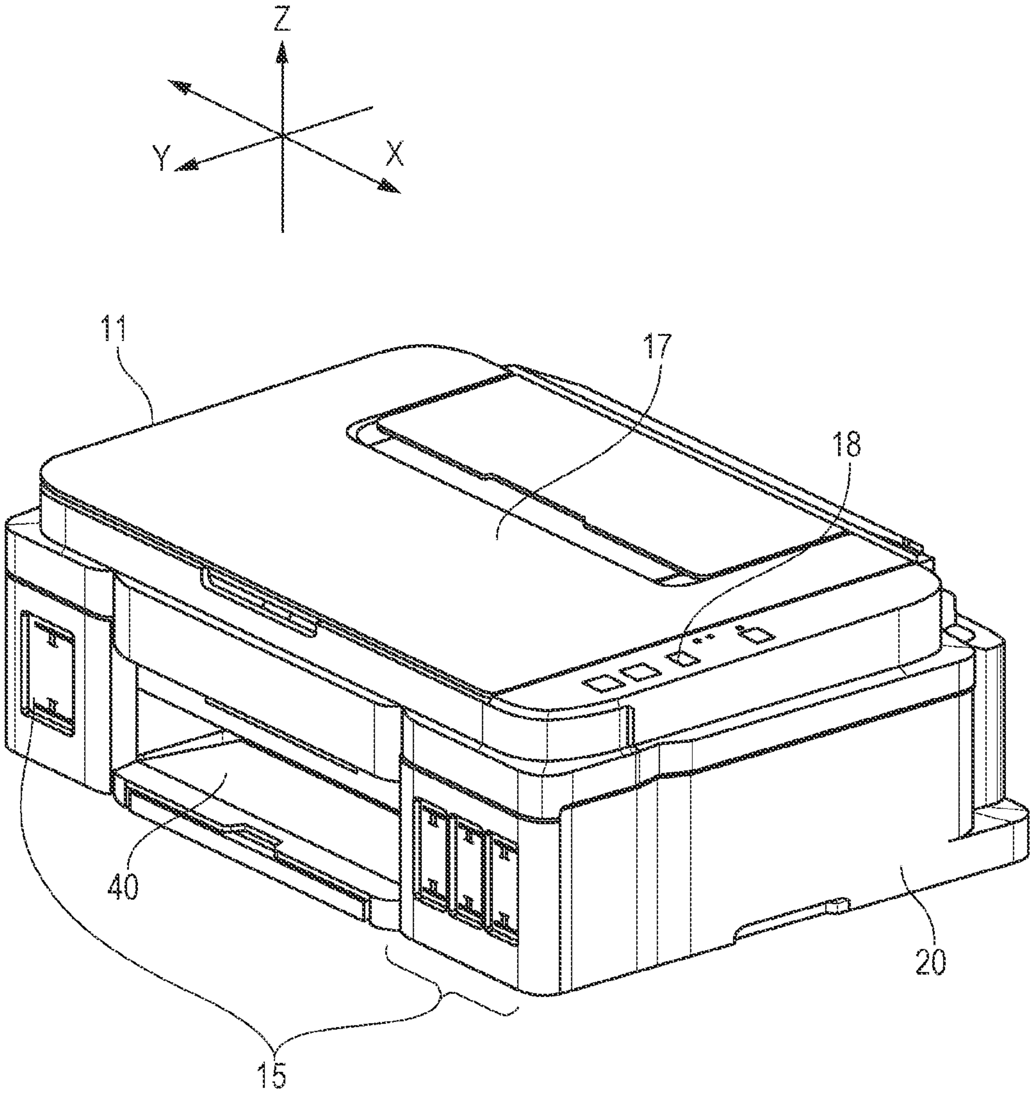
FIG. 1 is an external perspective view of a printing apparatus according to a first embodiment.

Embodiments of the present disclosure are described below with reference to the accompanying drawings. It should be noted that the following embodiments do not limit the present disclosure, and all of the combinations of the features described in the embodiments are not necessarily essential to the disclosure. In addition, the relative locations and shapes of the constituent elements described in the embodiments are merely illustrative and are in no way intended to limit the scope of the disclosure. In the drawings, arrows X and Y indicate horizontal directions orthogonal to each other, and arrows Z indicate the vertical direction.

First Embodiment

FIG. 1 is an external perspective view of an inkjet printing apparatus (hereinafter, simply referred to as a printing apparatus) 11 according to the present embodiment. As illustrated in FIG. 1, the printing apparatus 11 includes a casing 20 serving as an outer case, a print head 13 (refer to FIG. 2) that discharges liquid (ink) to a recording medium in order to print an image, and an ink tank 15 serving as an ink container for containing ink to be supplied to the print head 13. Furthermore, the printing apparatus 11 includes, on an upper portion of the casing 20, a cover 17 that is openable and closable with respect to the casing and an operation input unit 18 that allows the user to perform operations, such as command input. The cover 17 according to the present embodiment includes an image reading unit that performs a document reading operation.

Figure 2:
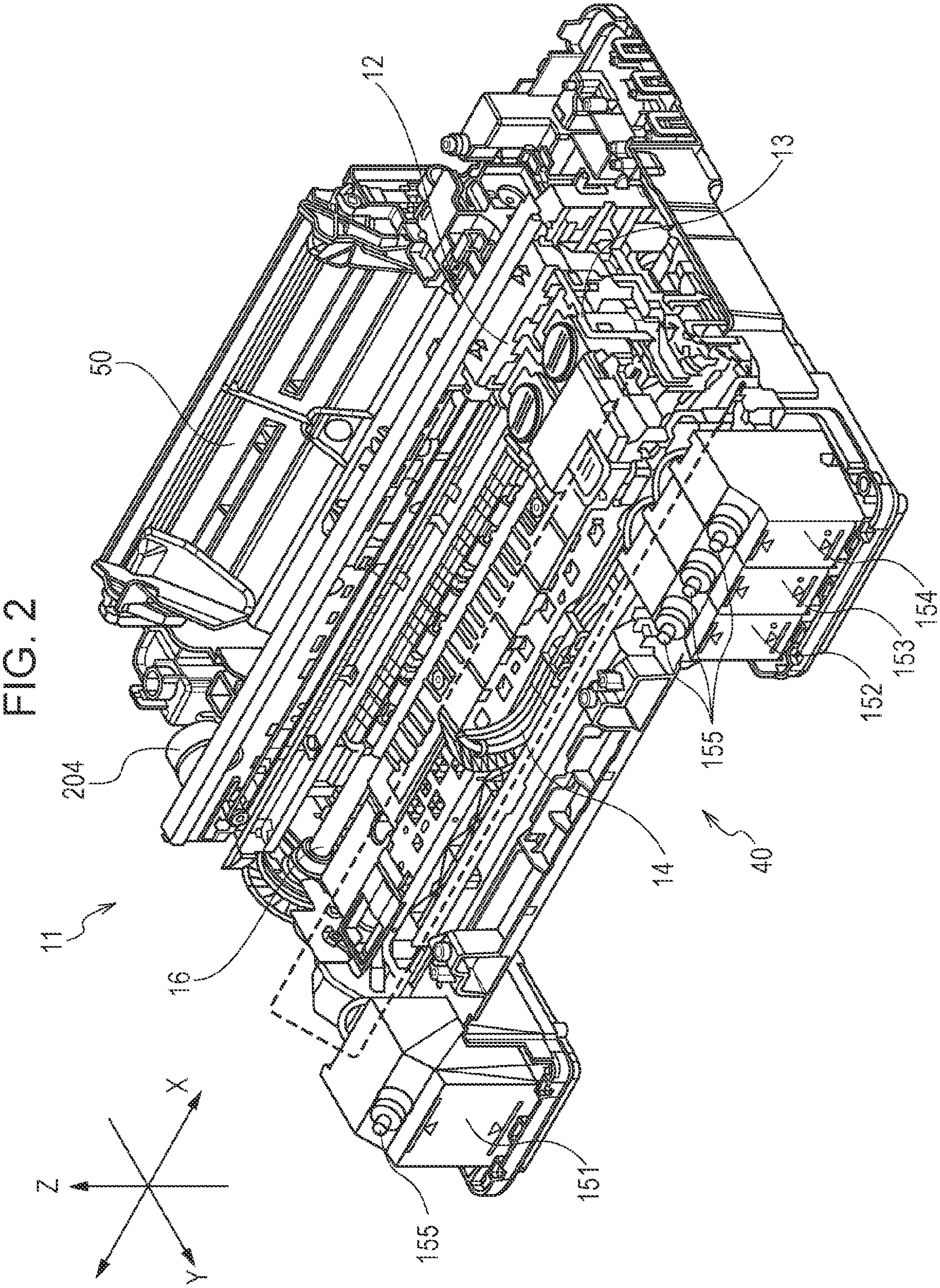
FIG. 2 is a perspective view illustrating the internal configuration of the printing apparatus according to the first embodiment.

FIG. 2 is a perspective view illustrating the internal configuration of the printing apparatus 11. The printing apparatus 11 feeds, by using a feeding unit (not illustrated), recording media stacked on a feeding tray 50 provided on the back surface of the printing apparatus 11. The fed recording medium is conveyed to a position facing the ejection surface of the print head 13 by a conveyance roller 16 serving as a conveyance unit. The recording medium subjected to the printing operation performed by the print head 13 is discharged to a discharging portion 40 by a discharge unit (not illustrated).

A direction in which the recording medium is conveyed by the conveyance roller 16 (the Y direction) is also referred to as a "conveyance direction". The upstream side in the conveyance direction corresponds to the back side of the printing apparatus 11, and the downstream side in the conveyance direction corresponds to the front side of the printing apparatus 11.

The print head 13 is mounted on a carriage 12 that reciprocally moves in the main scanning direction (the X direction) orthogonal to the conveyance direction. The carriage 12 is supported by a main chassis and moves when driven by the carriage motor 204 via a timing belt. The print head 13 ejects ink droplets while moving in the main scanning direction along with the carriage 12 and, thus, performs a printing operation to print an image for one band on the recording medium. After an image for one band is printed on the recording medium, the recording medium is conveyed by the conveyance roller 16 by a predetermined amount in the conveyance direction (an intermittent conveying operation). By repeating the printing operation for one band and the intermittent conveying operation, the image is printed on the entire recording medium.

Furthermore, the print head 13 according to the present embodiment includes a unit (for example, a heat generation resistance element) that generates thermal energy functioning as energy used to eject ink. The print head 13 employs a technique for causing a state change of ink (film boiling) by using the thermal energy. In this manner, high-density and high-definition image printing is achieved. Note that the present disclosure is not limited to a technique using thermal energy. For example, the present disclosure may employ a configuration including a piezoelectric element and a technique using vibration energy.

The ink tank 15 is provided in the printing apparatus 11 for each color of ink that can be ejected by the print head 13. According to the present embodiment, the ink tank 15 is fixed to the front side of the printing apparatus 11. The printing apparatus 11 includes a black ink tank 151 that contains black ink, a cyan ink tank 152 that contains cyan ink, a magenta ink tank 153 that contains magenta ink, and a yellow ink tank 154 that contains yellow ink. The four ink tanks are collectively referred to as an ink tank 15.

The black ink tank 151 is disposed on the left side of the discharging portion 40 as viewed from the front of the printing apparatus 11. In contrast, the cyan ink tank 152, the magenta ink tank 153, and the yellow ink tank 154 are disposed on the right side of the discharging portion 40 as viewed from the front of the printing apparatus 11. That is, the discharging portion 40 is provided so as to be sandwiched between the black ink tank 151 and a group of the color ink tanks in the main scanning direction. Note that the arrangement of the ink tanks 15 is not limited thereto. For example, as illustrated in FIG. 3, four ink tanks 15 may be disposed side by side on one side of the discharging portion 40 in the main scanning direction.

Each of the ink tanks 15 is connected to the print head 13 by an ink flow channel 14 for supplying ink to the print head 13. The ink flow channel 14 consists of, for example, a flexible tube. Each of the ink flow channels 14 independently supplies the ink contained in the ink tank 15 to the ejection port row of the print head 13 corresponding to one of the ink colors.

Figure 3:
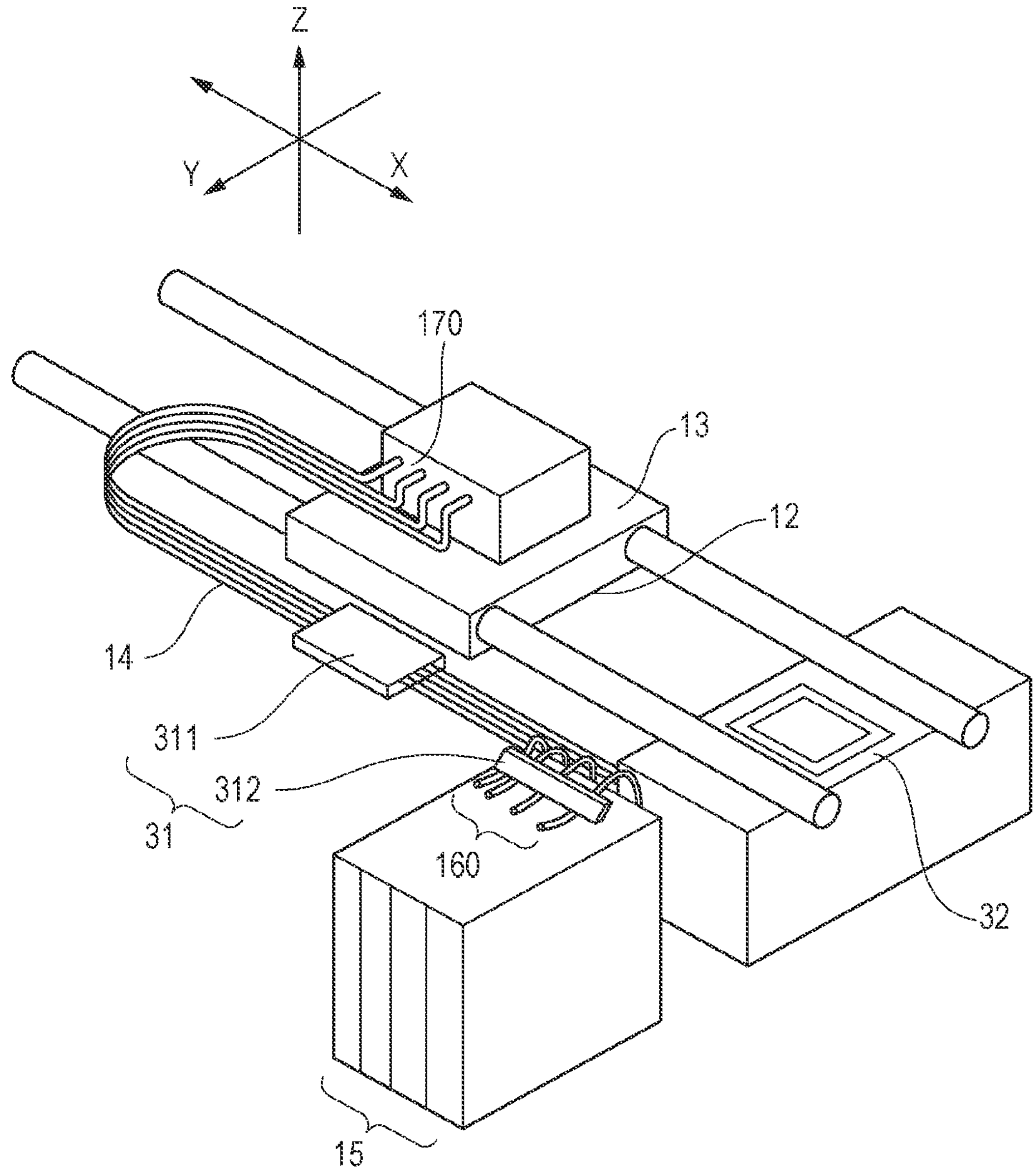
FIG. 3 is a perspective view illustrating a simple overview of an ink supply system of the printing apparatus according to the first embodiment.

FIG. 3 is a perspective view illustrating a simple overview of the configuration related to an ink supply system of the printing apparatus 11. The print head 13 and the ink flow channel 14 are connected to each other by a joint portion 170. In addition, a maintenance unit 32 is provided inside a moving area of the carriage 12 and outside a print area in which the printing operation is performed by the print head 13. The maintenance unit 32 performs a maintenance operation for maintaining the ejection performance of the print head 13. The maintenance unit 32 is disposed so as to face the ejection surface in which the ink ejection ports are arranged.

The printing apparatus 11 includes an actuator mechanism 311 serving as an opening/closing mechanism capable of opening and closing the ink flow channel 14. Furthermore, the printing apparatus 11 includes an actuator mechanism 312 capable of opening and closing an atmospheric communication flow channel 160 to allow the inside of each of the ink tanks 15 to communicate with the atmosphere. The two actuator mechanisms are also collectively referred to as a choke mechanism 31. The choke mechanism 31 is electrically operated by a mechatronic component, such as a solenoid. In addition, the choke mechanism 31 may include a mechanism that is manually operated when needed.

Figure 4:
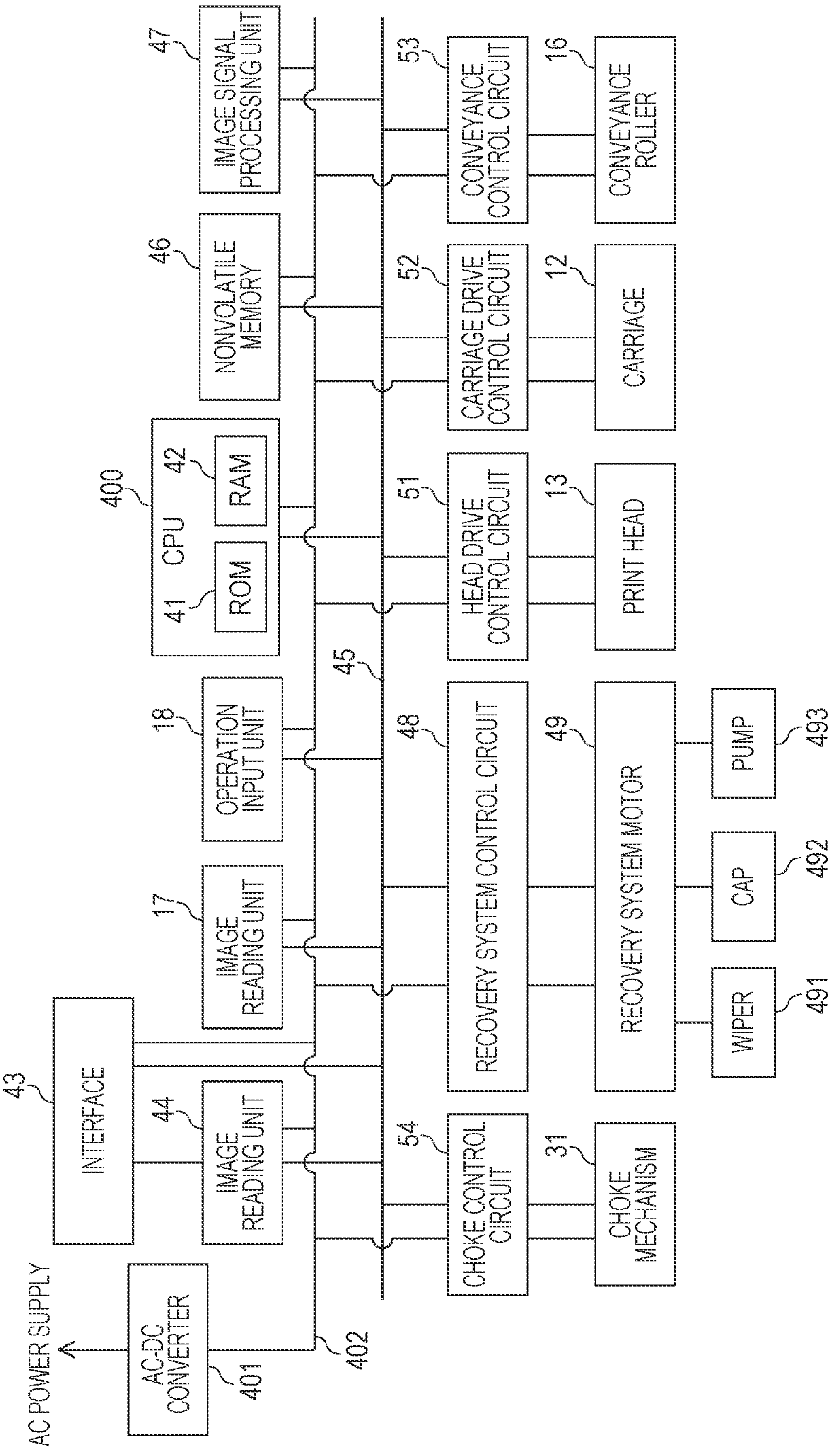
FIG. 4 is a block diagram illustrating the configuration of a control unit of the printing apparatus according to the first embodiment.

FIG. 4 is a block diagram illustrating the configuration of a control unit of the printing apparatus 11. A central processing unit (CPU) 400 controls each of the units of the printing apparatus 11 and performs data processing via a main bus line 45. The CPU 400 preforms a printing operation, a maintenance operation, or the like by controlling data processing, driving of the print head 13, driving of the carriage 12, and the like via the units described below in accordance with a program stored in a read only memory (ROM) 41.

Furthermore, the CPU 400 performs communication processing with a host apparatus via an interface 43. A random access memory (RAM) 42 is used as a work area for data processing by the CPU 400 to temporarily store print data for several lines, parameters related to the maintenance operations, and the like. An image reading unit 44 can temporarily hold an image input from the host apparatus via the interface 43. A nonvolatile memory 46 stores, for example, information regarding the ejection amount of ink of each color ejected to even the outside of the recording medium in border-free printing in which the ink is ejected to the outside of the recording medium. The nonvolatile memory 46 can hold the information even after the device main body is powered off.

A recovery system control circuit 48 controls the operation performed by the maintenance unit 32 by controlling driving of a recovery system motor 49 in accordance with a recovery processing program stored in the RAM 42. More specifically, the recovery system control circuit 48 controls the operations performed by a wiper 491, a cap 492, and a pump 493 included in the maintenance unit 32. The wiper 491 is a member that wipes the ejection surface of the print head 13.

The cap 492 is a member that caps the ejection surface of the print head 13. The pump 493 is connected to the cap 492. The pump 493 is a member that performs a suction operation of sucking ink from the print head 13 by driving the pump 493 with the cap 492 capping the ejection surface of the print head 13.

A head drive control circuit 51 controls driving for ink ejection performed by the print head 13 and causes the print head 13 to eject ink during the printing operation. A carriage drive circuit 52 controls the reciprocal movement of the carriage 12 in accordance with print data processed by an image signal processing unit 47. Furthermore, the carriage drive circuit 52 moves the carriage 12 to a position facing the maintenance unit 32 in order to perform a maintenance operation on the print head 13.

A conveyance control circuit 53 controls the recording medium conveying operation performed by the conveyance roller 16. The conveyance control circuit 53 controls an intermittent conveying operation in which after a print operation performed by the print head 13 for one band is completed, the recording medium is intermittently conveyed by a predetermined amount in the conveyance direction in order to print an image corresponding to the print data for the next band. A choke control circuit 54 controls the choke mechanism 31. Furthermore, the printing apparatus 11 includes an AC-DC converter 401 for connecting with an external AC power supply. The electric power from the AC power supply is supplied from the AC-DC converter 401 to the above-described units via a power supply line 402.

Figure 5:
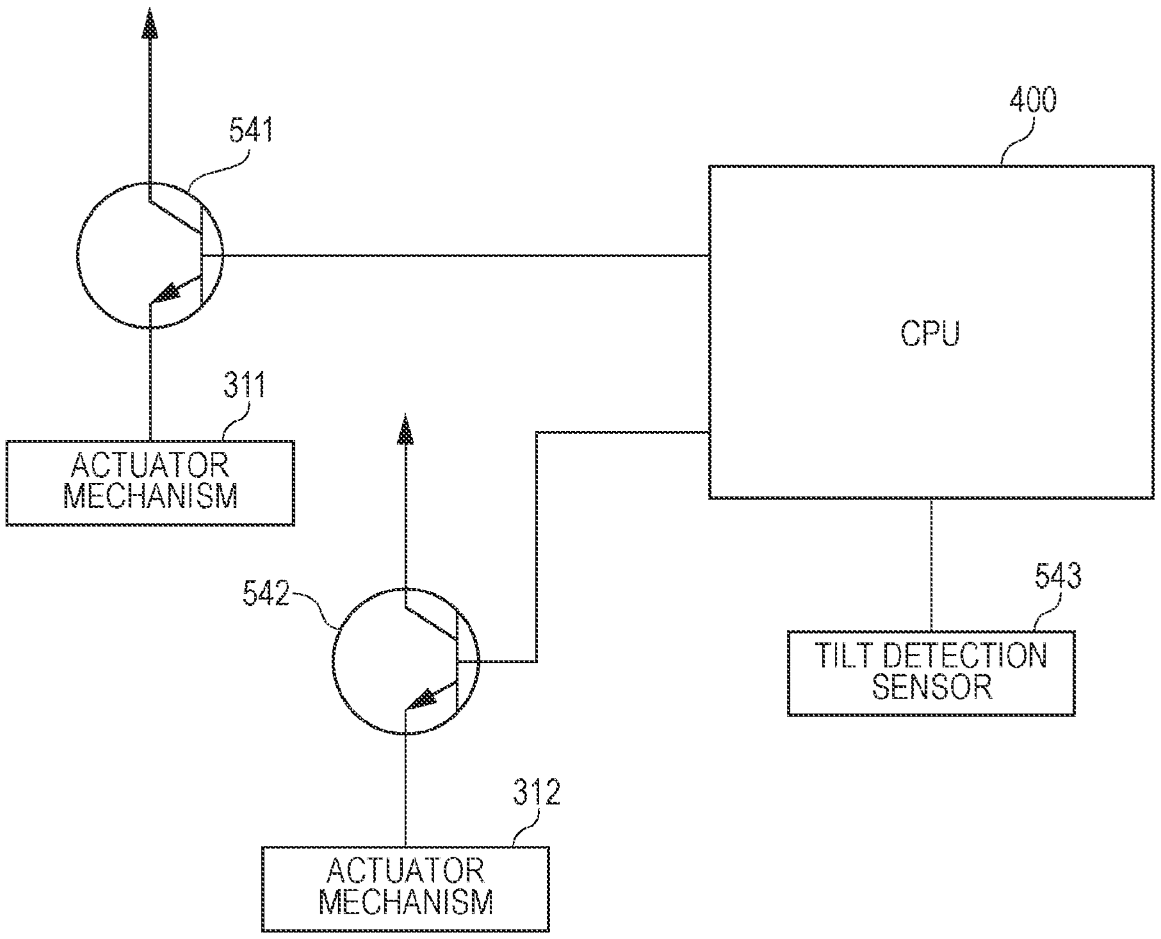
FIG. 5 is a block diagram illustrating the configuration of a choke control circuit of the printing apparatus according to the first embodiment.

FIG. 5 is a block diagram of the configuration of the choke control circuit 54 of the printing apparatus 11.

A transistor 541 is provided on a power supply circuit for the actuator mechanism 311, and the CPU 400 controls power supply to the actuator mechanism 311 by switching the transistor ON and OFF. In addition, a transistor 542 is provided on a power supply circuit for the actuator mechanism 312, and the CPU 400 controls power supply to the actuator mechanism 312 by switching the transistor ON and OFF. Furthermore, according to the present embodiment, a tilt detection sensor 543 is provided that can detect whether the casing 20 of the printing apparatus 11 is installed without tilting. Note that the present disclosure is also applicable to an apparatus not including the tilt detection sensor 543.

Figure 6:
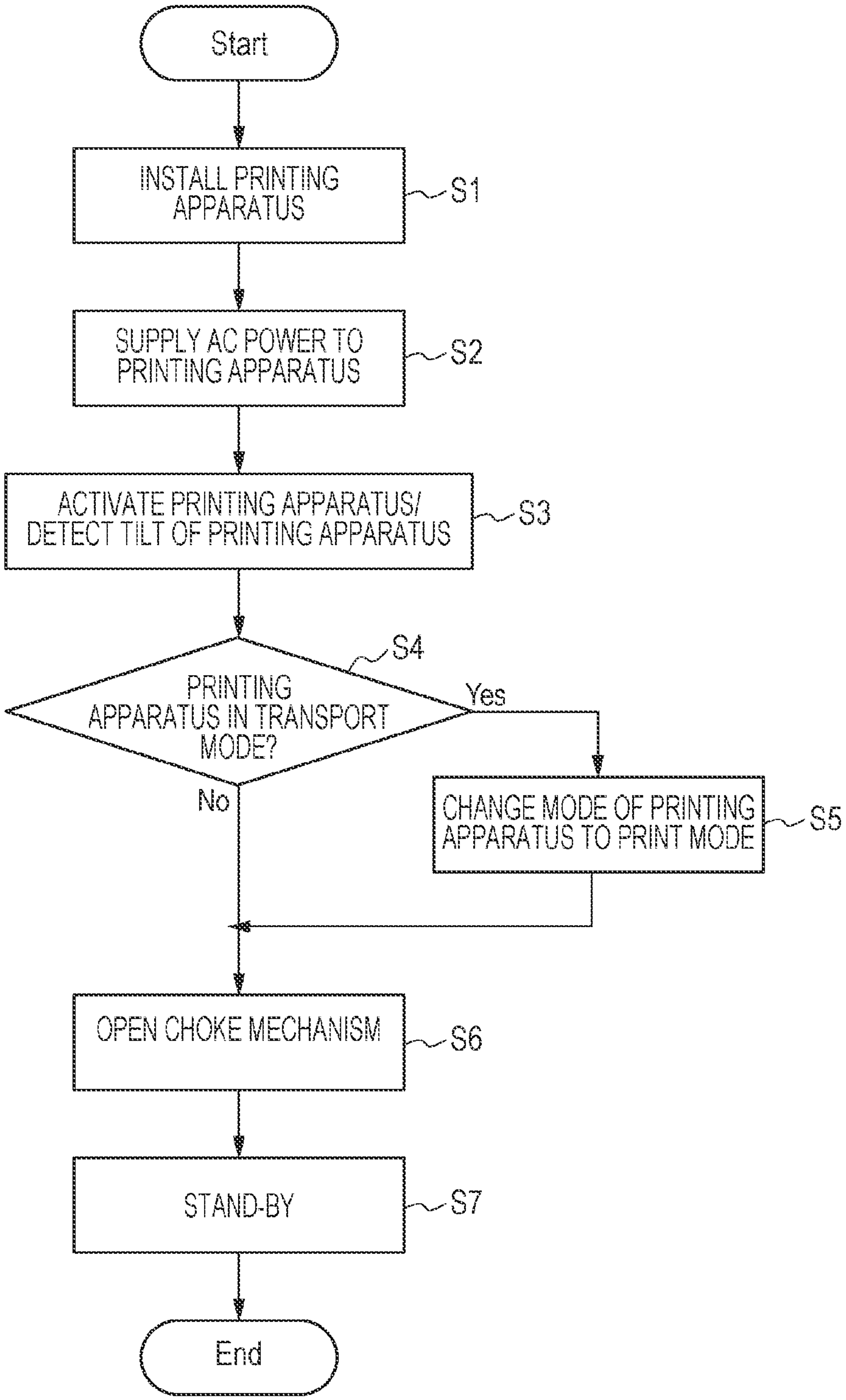

FIG. 6 is a flowchart when the printing apparatus 11 is powered on. In S1, the printing apparatus 11 is installed by a user. Thereafter, in S2, the user connects an AC power supply to a power supply unit (not illustrated) provided in the printing apparatus 11 to supply electric power to the printing apparatus 11. Hereinafter, the supply of electric power to the printing apparatus 11 via the power supply unit is also referred to as "power supply". Furthermore, in S3, the user presses a power button of the printing apparatus 11 to activate the printing apparatus 11. Note that when the printing apparatus 11 is not activated, the ink flow channel 14 and the atmospheric communication flow channel 160 are closed by the actuator mechanisms 311 and 312, respectively.

In the printing apparatus 11 including the tilt detection sensor 543 as in the present embodiment, it is detected in S3 whether the printing apparatus 11 is tilted. According to the present embodiment, if the printing apparatus 11 is tilted more than 10 degrees from the horizontal direction, the CPU 400 determines that the printing apparatus 11 is tilted. If it is determined that the printing apparatus 11 is tilted, the CPU 400 may send the user an error message. In addition, the CPU 400 may send the user a message prompting the user to re-install the printing apparatus via the host apparatus or the operation input unit 18.

Subsequently, in S4, it is determined whether the printing apparatus 11 is in a transport mode. If the printing apparatus 11 is not in the transport mode, the CPU 400 controls power supply to the actuator mechanisms 311 and 312 in S6 to open the ink flow channel 14 and the atmospheric communication flow channel 160, respectively. However, if the printing apparatus 11 is in the transport mode, the user inputs a transport mode release command via the host apparatus or the operation input unit 18 in S5 to change the mode of the printing apparatus 11 to a print mode. After the change to the print mode is made, the ink flow channel 14 and the atmospheric communication flow channel 160 are opened in S6. In S7, upon completion of the other initial operations (a reference position detection operation for the mechanisms and a maintenance operation of the print head 13), the CPU 400 enters a standby state in which the CPU 400 can receive a print command.

Figure 7:
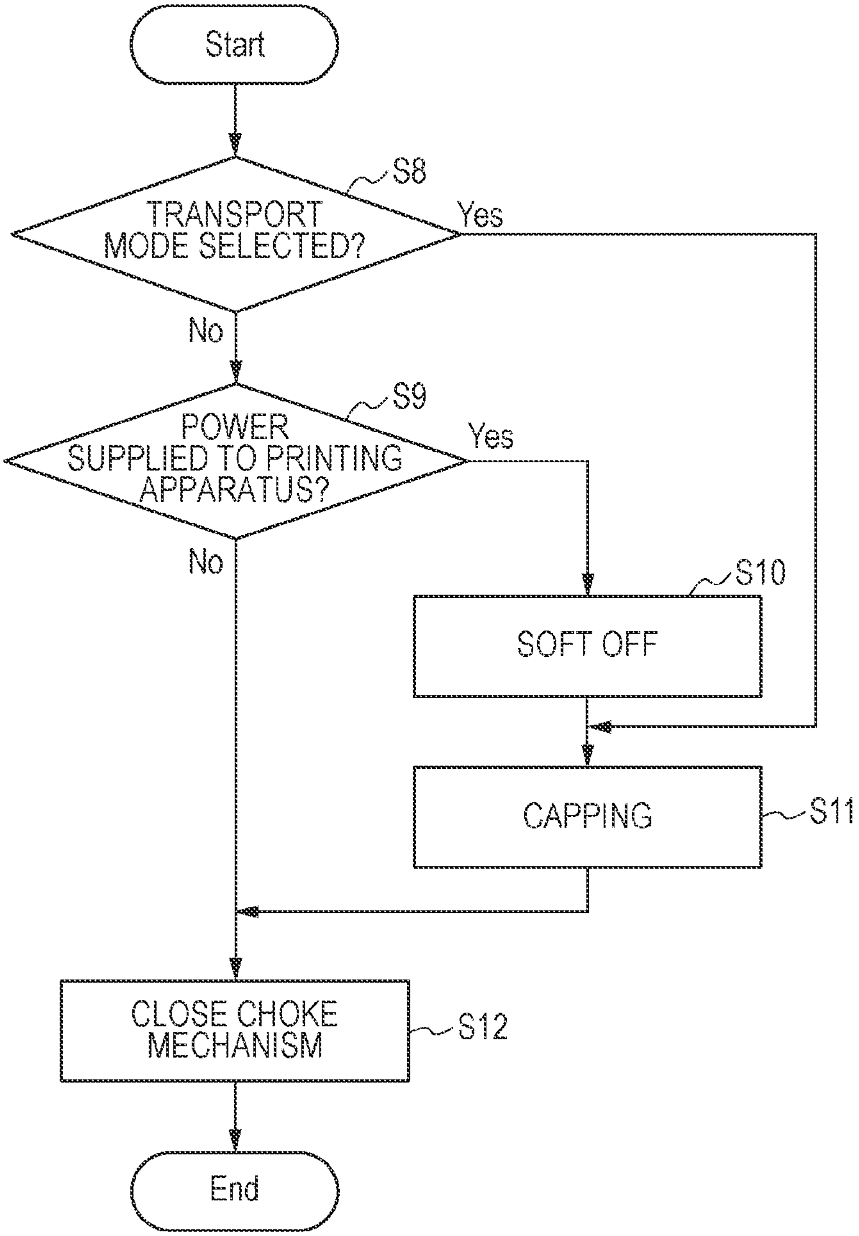
FIG. 7 is a flowchart from the time the printing apparatus according to the first embodiment is in a standby state until the time a choke mechanism enters a closed state.

FIG. 7 is a flowchart from the time the printing apparatus 11 is in the standby state until the time the choke mechanism 31 enters a closed state. In S8, the CPU 400 determines whether the transport mode is selected by the user via the host apparatus or the operation input unit 18. If the transport mode is selected, the CPU 400 caps the ejection surface of the print head 13 with the cap 492 in S11. Thereafter, in S12, the CPU 400 controls power supply to the actuator mechanisms 311 and 312 to set the ink flow channel 14 and the atmospheric communication flow channel 160, respectively, in the closed state. In this case, since the printing apparatus is supplied with electric power, the printing apparatus 11 can be transported in the activated state.

In contrast, if the transport mode is not selected, the CPU 400 determines in S9 whether electric power is supplied to the printing apparatus 11. If for some reason, electric power is not supplied to the power supply unit in the standby state, that is, if the power supply is lost, the determination in S9 results in No. In this case, since electric power is not supplied to the actuator mechanisms 311 and 312, the processing proceeds to S12, where the choke mechanism 31 is immediately closed.

Alternatively, if, although electric power is supplied in S9, the user executes a soft off of the printing apparatus in S10, the CPU 400 caps the ejection surface of the print head 13 with the cap 492 in S11. Thereafter, in S12, the CPU 400 controls power supply to the actuator mechanisms 311 and 312 to close the ink flow channel 14 and the atmospheric communication flow channel 160, respectively.

Figure 8:
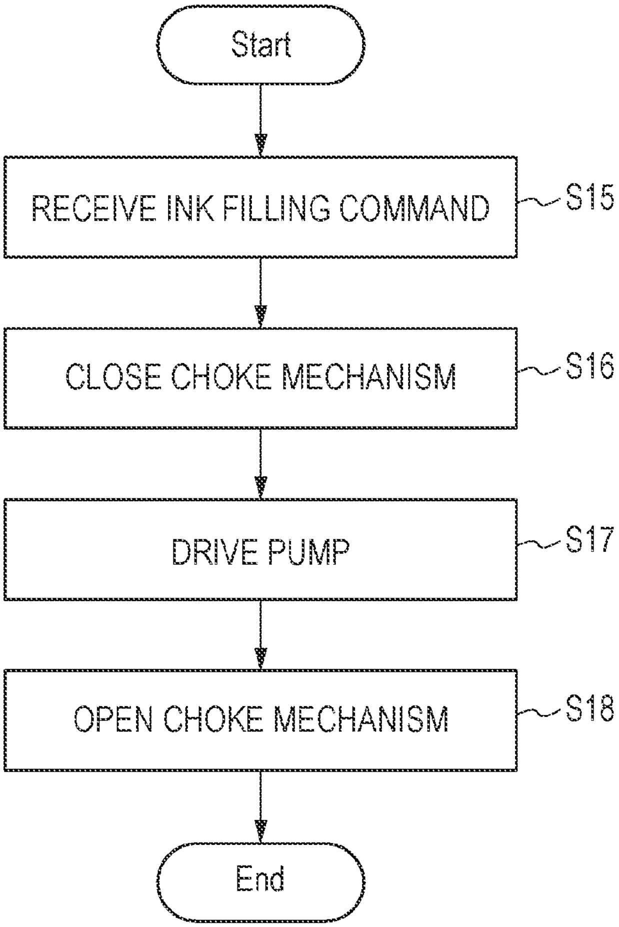
FIG. 8 is a flowchart of an ink fill operation performed by the printing apparatus using a choke mechanism according to the first embodiment.

FIG. 8 is a flowchart when the printing apparatus 11 uses the choke mechanism 31 to fill the print head 13 with ink from the ink tank 15. Upon receiving an ink fill command in S15, the CPU 400 controls power supply to the actuator mechanisms 311 and 312 in S16 to close the ink flow channel 14 and the atmospheric communication flow channel 160, respectively.

Subsequently, in S17, the CPU 400 drives the pump 493 with the ejection surface of the print head 13 capped by the cap 492. As a result, negative pressure is charged inside a portion of the ink flow channel 14 between the actuator mechanism 311 and the print head 13.

After driving the pump 493 for a predetermined time period in S17, the CPU 400 controls power supply to the actuator mechanisms 311 and 312 in S18 to open the ink flow channel 14 and the atmospheric communication flow channel 160, respectively. Through the operation performed in S18, the print head 13 is filled with ink from the ink tank 15 due to the negative pressure charged in S17. The flow illustrated in FIG. 8 may be performed several times as needed.

The above-described configuration can not only allow the user to open and close the ink flow channel 14 when the printing apparatus 11 is in a power-on state, but also set the ink flow channel 14 in a closed state by a mechanism, such as a solenoid, even when the power supply to the printing apparatus 11 is lost. As a result, the flow of ink between the print head 13 and the ink tank 15 can be blocked regardless of the power supply state of the printing apparatus 11 and, thus, liquid leakage from the printing apparatus 11 can be prevented. Furthermore, according to the present embodiment, since the atmospheric communication flow channel 160 of the ink tank 15 can be set in the closed state, liquid leakage from the ink tank 15 can be reliably prevented.

Other Embodiments

While the first embodiment has been described with reference to an example of a serial head in which the print head 13 is mounted on the carriage 12 that reciprocally moves, the present disclosure is not limited thereto. The present disclosure is applicable to a line head in which a plurality of ejection ports are arranged in a region corresponding to the width of a recording medium.

Furthermore, the ink tank 15 may be of a cartridge type that is removable from the printing apparatus 11 or may have a configuration including a filling portion 155 (refer to FIG. 2) that can be filled with ink.

Furthermore, a configuration may be employed that closes the ink flow channel 14 and the atmospheric communication flow channel 160 not only when the power supply is lost or when the transport mode is selected by the user, but also when the tilt detection sensor 543 detects that the printing apparatus 11 is tilted more than a predetermined angle.

Still furthermore, in all the above-described embodiments including the first embodiment, the configuration may be such that only the actuator mechanism 311 that closes the ink flow channel 14 is mounted.

According to the present disclosure, a printing apparatus capable of preventing liquid leakage is provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-104933 filed Jun. 24, 2021, which is hereby incorporated by reference herein in its entirety.

What is claimed is:

1. A printing apparatus comprising:

a print head configured to perform a printing operation;

a tank configured to contain liquid to be supplied to the print head, wherein the print head is configured to perform the printing operation by ejecting the liquid;

a flow channel configured to supply the liquid from the tank to the print head;

a sensor configured to detect whether the printing apparatus is tilted from a horizontal direction by more than a predetermined angle; and a closing mechanism configured to close the flow channel, wherein the printing apparatus has a standby state in which a print operation is not performed and in which a print command is receivable, wherein the flow channel is open when the printing apparatus is in the standby state, wherein the closing mechanism closes the flow channel when the printing apparatus is in the standby state and when a user selects a transport mode, and wherein, if the sensor detects that the printing apparatus is tilted from the horizontal direction by more than the predetermined angle, the closing mechanism closes the flow channel.

2. The printing apparatus according to claim 1, further comprising an atmospheric communication flow channel configured to allow the tank to communicate with an atmosphere, wherein the closing mechanism closes the atmospheric communication flow channel when the printing apparatus is in the standby state in which a print command is receivable by the printing apparatus and enters a state in which electric power is not supplied to a power supply unit.

3. The printing apparatus according to claim 2, wherein, when the printing apparatus is in the standby state in which a print command is receivable by the printing apparatus, the closing mechanism closes the atmospheric communication flow channel if the user selects a transport mode.

4. The printing apparatus according to claim 3, further comprising a sensor configured to detect whether the printing apparatus is tilted from a horizontal direction by more than a predetermined angle, wherein, if the sensor detects that the printing apparatus is tilted from the horizontal direction by more than the predetermined angle, the closing mechanism closes the atmospheric communication flow channel.

5. The printing apparatus according to claim 2, further comprising a sensor configured to detect whether the printing apparatus is tilted from a horizontal direction by more than a predetermined angle, wherein, if the sensor detects that the printing apparatus is tilted from the horizontal direction by more than the predetermined angle, the closing mechanism closes the atmospheric communication flow channel.

6. The printing apparatus according to claim 1, wherein the tank includes a filling portion used to fill the tank with the liquid.

7. The printing apparatus according to claim 1, wherein the closing mechanism closes the flow channel when the printing apparatus is in a state in which the printing apparatus receives electric power from a power supply unit and enters a state in which electric power is not supplied to the power supply unit.

8. The printing apparatus according to claim 1, wherein the closing mechanism closes the flow channel when the printing apparatus, being supplied with electric power from a power supply unit and being in the standby state in which a print command is receivable by the printing apparatus, enters a state in which the electric power is not supplied to the power supply unit.

9. A method for controlling a printing apparatus, wherein the printing apparatus includes a print head, a tank configured to contain liquid to be supplied to the print head to perform a printing operation by ejecting the liquid, a flow channel configured to supply the liquid from the tank to the print head, a sensor, and a closing mechanism, wherein the printing apparatus has a standby state in which a print operation is not performed and in which a print command is receivable, wherein the flow channel is open when the printing apparatus is in the standby state, and the method comprising:

closing the flow channel by using the closing mechanism when the printing apparatus is in the standby state and when a user selects a transport mode, and closing the flow channel by using the closing mechanism if the sensor detects that the printing apparatus is tilted from the horizontal direction by more than a predetermined angle.

10. The method according to claim 9, further comprising closing the flow channel by using the closing mechanism when the printing apparatus is in a state in which the printing apparatus receives electric power from a power supply unit and enters a state in which electric power is not supplied to the power supply unit.

11. The method according to claim 9, further comprising closing the flow channel by using the closing mechanism when the printing apparatus, being supplied with electric power from a power supply unit and being in the standby state in which a print command is receivable by the printing apparatus, enters a state in which the electric power is not supplied to the power supply unit.

12. A printing apparatus comprising:

a print head configured to perform a printing operation;

a tank configured to contain liquid to be supplied to the print head, wherein the print head is configured to perform the printing operation by ejecting the liquid;

a flow channel configured to supply the liquid from the tank to the print head; and an atmospheric communication flow channel configured to allow the tank to communicate with an atmosphere; and a closing mechanism configured to close the flow channel, wherein the printing apparatus has a standby state in which a print operation is not performed and in which a print command is receivable, wherein the flow channel is open when the printing apparatus is in the standby state, and wherein the closing mechanism closes the flow channel and the atmospheric communication flow channel when the printing apparatus is in the standby state and when a user selects a transport mode.

* * * * *